Figure 1:
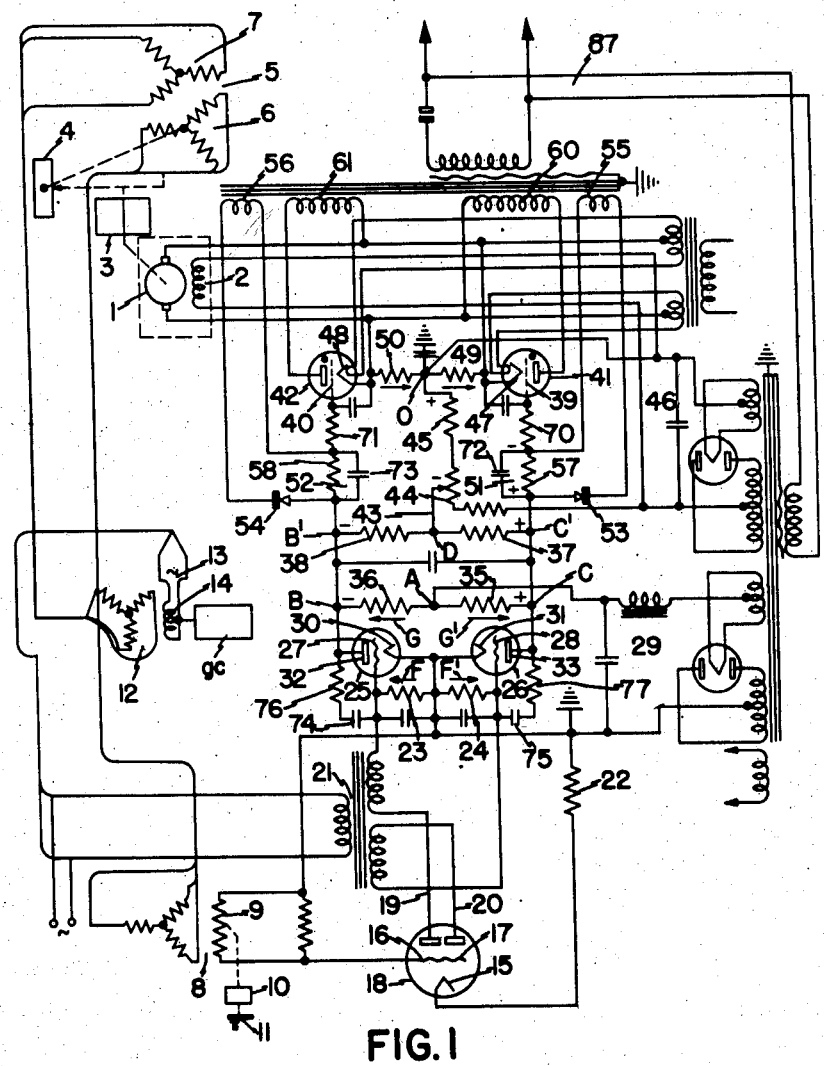

June 14, 1949. W. G. GORTON 2,473,423
ANTIHUNT ELECTRICAL SERVO SYSTEM
Filed June 18, 1945 2 Sheets-Sheet 1

INVENTOR.
WILLIAM G. GORTON
BY
HIS ATTORNEY

Patented June 14, 1949

2,473,423

UNITED STATES PATENT OFFICE 2,473,423

ANTIHUNT ELECTRICAL SERVO SYSTEM

William G. Gorton, Belmont, Mass., assignor, by mesne assignments, to Submarine Signal Company, Boston, Mass., a corporation of Delaware Application June 18, 1945, Serial No. 599,988

7 Claims. (Cl. 318—30)

The present application is a continuation in part of my prior application Serial No. 511,159, filed November 20, 1943, for Control circuits, now Patent No. 2,466,022, issued April 5, 1949.

The present invention relates to an electrical control circuit to provide a reversible, variable speed motor drive and in particular to provide a so-called follow-up or positioning system which may be applied to a training control system for training any device, such as may be used in submarine signaling apparatus, in radar apparatus, for gun or gun turret training, or it may be applied to the control of machine tools and other devices.

In my prior application, above noted, I presented a control circuit employing gaseous discharge tubes for the supply of operating current to a D. C. electric motor. The circuit described in that application was, furthermore, particularly adaptable to the control of the motor in forward and reverse directions as a part of a follow-up system. In such systems the control motor is generally used to position a load device in accordance with orders received from a command device which may be located at a remote point. The command device may be coupled with or take the form of a rotary transformer or self-synchronous device which is electrically connected to a similar device mechanically coupled to the load. The general object of systems of this type is to provide a control of the operating motor such that the load device follows, as nearly instantaneously as possible, the orders transmitted by the command device.

In many of the prior art systems a fairly low, often 1:1, gear ratio has generally been used between the load and the self-synchronous device or rotary transformer (hereinafter simply called "synchro") coupled to the load. In order to increase the static and dynamic accuracy of the follow-up system it is, however, desirable to increase this gear ratio to, say, 10 to 1, that is to make the load synchro make ten revolutions to one revolution of the load. When this is done, however, with a control system of the general type described in the above-mentioned application, a limiting gear ratio is found above which the system becomes unstable and hunting occurs. I have discovered that, with a given maximum load speed, this is due primarily to the increased rate of change of the displacement potential generated by the load and command synchros. According to the present invention the control circuit is so arranged and adjusted that the rate of change of the potential which controls the operation of the motor-energizing gaseous discharge tubes is suitably controlled so that hunting in the follow-up system is completely avoided. My invention will best be understood from the following description, taken in connection with the accompanying drawings in which Fig. 1 shows a circuit diagram of the system; and Fig. 2 shows two sets of curves $a$ and $b$ illustrating operating conditions for the gas tube portion of the system.

Figure 2:
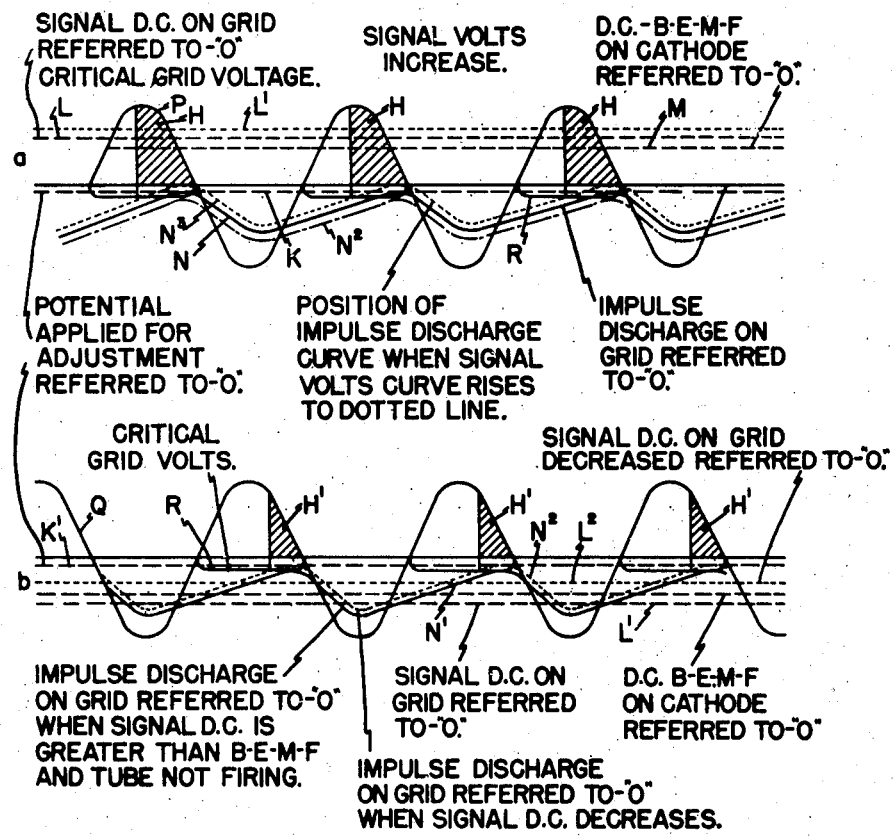

In the arrangement shown in Fig. 1, 1 indicates a direct current motor armature which is provided with a magnetic field by means of the field winding 2. In the arrangement of Fig. 1 the motor armature is connected to a gear reduction system 3 which operates the load 4 which may be any type of device, as, for instance, a radio locator, a submarine signal sounding ranging head, a turret gun, rotating machinery or positioning devices generally used for industrial purposes. The load 4 is mechanically connected with a self-synchronous or servo system. One of the synchro elements is shown at 5 in which the portion 6 is intended to be used as the rotating element and the portion 7 as a stationary element. The stationary portion of the synchro 5 is electrically connected with a second synchro 8 which is provided with a rotor 9 adapted to be positioned through the reduction gear 10 operated by a manual control indicated by a handwheel 11. The device 5 is termed the load synchro and the device 8 is termed the command synchro. If desired, this system may be tied up with a gyrocompass through the synchro unit 12 which is supplied by alternating current over the line 13 which may be of any desired frequency, 60 cycles or more. The gyrocompass will rotate the rotor element 14 and vary the phase impressed upon the synchros 5 and 8 so that the variation in voltage appearing across the rotor winding 9 which provides the signal impulse for the operation of the system will be the differential phase voltage between the synchros 5 and 8 or that existing as a resultant component among all three synchro units 5, 8 and 12 if the unit 12 is used. In this way it will be possible to provide, for instance, on shipboard, an absolute directional control for the turning of a directional pickup system as, for instance, a submarine signaling ranging unit or an electromagnetic directional ranging system.

The signal voltage applied across the rotor winding 9 is impressed between the cathode 15 and the grids 16 and 17 of the vacuum tube 18. This tube 18 is supplied between the cathode 15 and the anodes 19 and 20 with alternating potentials 180 degrees out of phase with each other through the transformer 21 which may be energized by the same alternating current potential applied to the synchro system.

The tube 18 may be of the 6N7 type and is, in fact, used in the circuit described as a rectifier. A resistance 22 may be used as a bias for the cathode, and each anode-cathode circuit may be provided with similar resistances 23 and 24 which are connected in circuit with the vacuum tubes 25 and 26, respectively, to provide grid bias control for the motor circuits which will be described later. Since the grids 16 and 17 of the tube 18 are connected together, their potential is always the same, and therefore unless the phase on the anodes 19 and 20 is ninety degrees out of phase with the grid voltage, the grid voltage can only be in the proper phase with one of the anode-cathode circuits of the tube 18. When it is in phase, therefore, with the anode-cathode circuit 15 and 19, an increased amount of current will flow through the resistor 23 in the direction of the arrow F; and when the grid potential is in phase with the anode-cathode circuit 20—15, an increased amount of current will flow through the resistor 24 in the direction of the arrow F'. Therefore, as the potential on the grid 27 of the tube 25 becomes more negative, the grid 28 of the tube 26 will become more positive and so, therefore, the tube 26 will tend to conduct increased current through the resistor 35 in the direction of the arrow G' while the current in the resistor 36 in the direction of the arrow G will drop to zero.

This system, therefore, provides opposite changes in two halves of a symmetrical circuit. The vacuum tubes 25 and 26, which may be of the same type as the vacuum tube 18, are energized through a direct current rectifier 29, the potential of which is applied between the cathodes 30 and 31 and the anodes 32 and 33 of the tubes. The positive potential of the rectifier 29 is not applied directly to the anodes 32 and 33 but through the resistors 35 and 36 which are connected in series across the anodes 32 and 33. The result of this arrangement is that when the signal voltage biases the cathode-anode current in one of the tubes 25 or 26 to a cut-off value, the potential from the point B to C is in one direction, and when the current in the other tube is biased to cut off, the direction of the potential drop reverses. In this change the potential across the appropriate resistor 35 or 36 becomes zero and therefore the potential of the appropriate anode becomes that of the point A. The potential from the point B to C controls the voltage drop across a parallel resistance divider circuit made up of the resistances 37 and 38 which provide potentials entering as elements in the control of the grids 39 and 40 of the gaseous discharge tubes 41 and 42, respectively, which control the supply of current to the armature 1 of the motor in a manner which will be presently described.

The center point D between the resistances 37 and 38 is connected by an adjustable tap 43 to a potentiometer 44 which is connected in series with a fixed resistance 45 across a second rectifier 46 which may also be used to supply current to the field of the winding 2. The gaseous discharge tubes 41 and 42 have cathodes 47 and 48 which are connected to each other through resistances 49 and 50 of equal magnitude. The midpoint O between the resistance 49 and 50 is tied to one side of the rectifier 46 to which the resistance 45 is connected.

It will be noted that the points B' and C' are always at the same potentials as the points B and C, respectively, and it further should be noted that the currents flowing through the resistances 37 and 38 at any instant are always in the same direction. Therefore, as the potential B approaches the potential A through the cutoff of current in the resistance 36, the potential drop from B' to C' increases, tending by this action to decrease the negative bias on the grid 40 of the tube 42. Current may flow in either direction from B' to C'. If the current collapses in the resistance 36, current will flow through 38 and 37 in the direction from B' to C', while if current collapses in the resistance 35, current will flow in the opposite direction in the resistance 38, namely from C' to B'. A change in direction of flow of current in the resistances 37 and 38 brings about a reversal of biases on the grids 39 and 40 and consequently the reversal of rotation of the armature 1. However, before a complete reversal occurs from one direction to the other, the current in the resistances 37 and 38 decreases in magnitude before reversing direction. This has the effect, as will be noted later, of decreasing the signal voltage below that of the generated back E. M. F. since this current decrease occurs with a more rapid acceleration than the decrease in armature speed, and therefore provides, as will be seen later, a reversal of current flow through the armature even before the direction of rotation of the motor is changed. This action, too, is sufficiently uniform and gradual so that a smooth transition is made from forward to reverse rotation. The rectifier 46 is connected between the cathodes 47 and 48 and the grids 39 and 40 so that a small negative bias may by this means be applied to the grids of the discharge tubes with respect to the cathodes. In the curves $a$ and $b$ of Fig. 2 this is indicated by the dotted lines K and K' labelled in both cases "Potential applied for adjustment referred to 'O,'" the potential being applied to the grids. This is usually a small value of the order of two or three volts. The potential drop applied between B' and C' in the operation of the system may vary over a great range, the range being from zero to the magnitude of the generated back E. M. F. or greater in either direction. When the tube 42 is firing during a portion of its positive half cycle, the voltage across from B' to D is such as to place a positive potential on the grid 40 of the tube 42. This is shown in the curve $a$ of Fig. 2 as the dotted line L. Under these conditions the potential drop through the resistance 50 will be such as to place the cathode 48 at a higher potental than the point O in the circuit. This is shown in curve $a$ of Fig. 2 as the line M. The relative values between the signal D. C. on the grid and the back E. M. F. on the grid will vary, depending upon the instantaneous state of operation. If the signal voltage has suddenly been reduced, then the back E. M. F. may be greater than that of the signal volts. In the curve shown in $a$ of Fig. 2, the instantaneous condition is that where the signal volts are higher than the back E. M. F. The net effect of this combination is to have a positive difference voltage of these two components on the grid 40 of the tube 42. Under these conditions the tube would fire unless the potential adjustment through the potentiometer 44 is such as to bring the negative bias on the grid 40 of the tube 42 below the critical voltage curve which is shown on a of Fig. 2 labelled "Critical grid voltage."

The discussion above does not take into consideration another important element in the grid control circuit. This is the condenser discharge circuit of which there are two, one 51 connected in series in the grid circuit 39 and one 52 connected in series in the grid circuit 40. These circuits are energized through selenium rectifiers 53 and 54 energized through the windings 55 and 56, respectively, through the alternating current source 57. The windings 55 and 56 are 180 degrees out of phase with each other so that the rectified impulses supplied across the resistances 57 and 58 are 180 degrees out of phase with each other. These rectified pulses supply a direct current pulse discharge in the grid circuits indicated by the curves N and N' in curves a and b of Fig. 2. The adjustment of this discharge circuit may be such as to provide always a small amount of negative bias through proper choice of values of resistance and capacities in the discharge circuit. The pulse, however, is such as to provide a rather rapid decrease in grid potential during the critical part of operation of the tube so that the instant of discharge of the tube may be readily controlled.

In the curve a shown in Fig. 2 the negative bias on the grid 40 of the tube 42 with respect to the cathode is the sum of the instantaneous values on the curve N, the line K and the line M, while the positive potential on the grid is that of the line L. If the absolute values at a given instant of N, K and M are greater than L by an amount equal to the critical grid voltage value, then the tube 42 will not discharge.

The tubes 41 and 42 have their anode-cathode circuits connected in reverse direction through the armature I and the alternating current transformer windings 60 and 61 supplied through the supply line 57. These windings 60 and 61 are also 180 degrees out of phase with each other, the phase of 60 being the same as that of 55 and the phase of 61 being the same as that of 56. The alternating potential is shown in the curves a and b of Fig. 2 as P and Q, respectively, P being applied to winding 61 and Q to the winding 60.

It may be assumed for reference that current flowing through the tube 42 will ultimately bring about operation of the armature in the forward direction, and current flowing in the tube 41 will ultimately bring about operation in the reverse direction, the word "ultimately" being used in the sense that, during the transition period, the motor may not be rotating in the direction corresponding to the flow of current in the tube.

The operation of the system will best be understood by assuming various practical conditions of operation. Assume, first, that it is desired to accelerate the rotation of the armature I in a forward direction. In this case the discharge tube 42 will, under our presumption previously made, be the tube to fire. To accomplish this the potential drop across the resistances B', C' must be in the direction from left to right in Fig. 1, and consequently the drop from B to C will be in the same direction. This means that the current flow in the resistance 36 must decrease and that in the resistance 35 increase. This is accomplished by biasing the grid 27 of the tube 32 to cut off the cathode-anode current flow which, in turn, is accomplished through increase of current through the resistance 23 in the direction of the arrow F. The phase and direction, therefore, of the potential in the grid 16 of the tube 18 are positive during the positive half-cycle potential between the cathode 15 and the anode 19, thus causing current to flow through the resistance 23 in the direction of the arrow F. During this moment the current in the resistance 24 in the direction of the arrow F" has decreased, meaning that the bias is in such a direction that there is a tendency to decrease the current flow between the cathode 15 and the anode 20 in the tube 18.

Under conditions where the currents F and F" are equal which is when the grid bias is at a point midway between the two positive phases on the cathodes, the currents flowing in the resistances 35 and 36 will be in equal and opposite directions, which means that the potential between the points B' and C' will be zero and therefore no current will be flowing in the resistors 37 and 38.

When the anode-cathode current in the tube 25 is cut off, the potential at the point B' is greater than at C' and current flows through the resistors 38 and 37 from the left to the right as shown in Fig. 1. If, however, current is cut off in the anode-cathode circuit of the tube 26, current will flow in the resistance 36 and the potential of C' will be higher than the potential of B'. The reversal of direction of rotation of the motor is accomplished in this fashion. In between these points of extremity, the potential drop between B' and C' and therefore B' and D may be decreasing to such an extent that the tube 42 will not fire while the tube 41 will fire. In this case the back E. M. F. is greater than the signal voltage and as a result the tube 42 will cease discharging before the tube 41 commences to discharge because of the applied negative potential in the resistances 44 and 45. The resistances 44 and 45 in this change-over have current flowing in such a direction that they aid in maintaining the negative bias on the tube 41 and oppose the positive bias of the resistance 38 on the tube 42. As the current across the resistances from B' to C' decreases, the positive bias on the grid 40 will be overcome by the negative drop in the resistances 44 and 45 and the back E. M. F. drop in the resistance 50. Since the drop in the resistances 38 and 37 is equal, the bias applied to the grid 39 will be the sum of both negative potentials, namely that in the resistance 37 and the resistances 44 and 45, making a larger magnitude of negative bias applied to the grid 39 than positive bias applied to the grid 40.

Following, however, this point of operation, the back E. M. F.'s in the resistances 49 and 50 take over to create a sufficient bias on the tube 41 so that this tube will operate. This bias may be slightly less than zero, perhaps one or two volts, or a little greater or equal to zero, in which case the tube 41 fires for the complete cycle. The term "positive bias" in the above discussion is used in the limited sense, that the direction of potential applied to the grid is positive through the element mentioned, but it may not, however, be absolutely positive because of the other negative components making up the absolute bias on the tubes. In this connection it will be noted that most discharge tubes will discharge for the complete positive half of the cycle when the bias on the grids is zero, or perhaps even slightly less than zero, and that if the biases on the grids are less than zero, the discharge will occur during some point in the positive half cycle of potential applied between the anode and the cathode of the tube, depending upon the parameters of the tube and voltages establishing the characteristic of the critical grid voltage curves.

In the curves shown in Fig. 2 the curves R illustrate the grid voltage curves with reference to the alternating current cycles applied between the cathode and anode of the tube. The pulse discharge produced across the resistances 57 and 58 creates a negative bias applied to the grids 39 and 40 of the tubes 41 and 42, which bias varies in accordance with the curves N and N' previously mentioned. The instantaneous magnitude of the potential supplied by these pulse discharges is a component which must be added algebraically to the other potentials applied to the grid to determine the instantaneous potential as applied to the grid with reference to the alternating cycle between the anode and cathode of the tube and the critical grid voltage characteristic. In normal conditions when the discharge tubes are not operating, this total potential on the grid is such as to place the pulse curve below the critical grid voltage line. In curve $a$ of Fig. 2 it will be noted that the curve N in its full-line position intersects the critical grid voltage characteristic. It should be noted, however, that in this set of curves the impulse discharge on the grid is referred to the point O in the same way that the curves L, M and K are referred to the point O. The net bias voltage in these curves of Fig. 2a is such that the curve N with reference to the voltage across the anode-cathode of the tube would be dropped to the dotted line position of the curve $N_2$ and thus the tubes in this condition may not be firing. If, however, the signal voltage or preferably the voltage from B to C' is increased from the value L to the value of, say, $L_1$, the curve N may be raised to the point $N_3$, bringing about the intersection between the critical grid volt curve and the curve $N_3$ at such a point to bring discharges in the cycles shown in the shaded areas H. If this is assumed to be the discharge in the tube 42, the motor will be operated in the forward direction.

Referring now to the curves of $b$ in Fig. 2, while the pulse in the curve $a$ is in the position $N_2$, the pulse in the curves of $b$ may be in the position N'. If the tube 42 is firing, no discharge will occur in the half cycles of the curve Q. If, however, the signal volts L' in curve $b$ should suddenly decrease in magnitude, in curves $b$ the line of the signal volts will change from a position L' to $L^2$, thus in effect raising the impulse discharge curve to the dotted line position $N^2$ which intersects the critical grid volts curve to provide a discharge in the shaded area H'. In this condition the motor will be running in a forward direction but current will be passed through the motor in a reverse direction, thus providing an effective brake action. The motor will reverse in the curves of Fig. 2b when both the back E. M. F. lines and the signal volts lines rise above the zero reference line and become positive potentials. In this case, of course, the lines M and L in curves $a$ will pass below the zero reference line.

The resistances 70 and 71 in the grid circuits of the tubes 41 and 42 are current-limiting resistors. The adjustable tap on the potentiometer 44 is adjusted to such a point that with no potential across from B' to C', neither of the tubes 41 and 42 will discharge. The control of the torque characteristic on the motor 1 is obtained through the adjustment of values of the condensers 72 and 73 with the resistances 57 and 58, respectively, providing the desired form for the discharge curves N and N'. In place of the rectifiers 29 and 46, direct current supplies may be used.

The system so far described is similar to that set forth in my copending application, Serial No. 511,159. In order to provide an adjustment for the control circuit whereby its response may be correlated with the response of the load driven by the motor, I further provide, according to the present invention, condenser 74 connected in series with a resistance 76, the two together being connected across the anode and grid of the tube 25; a similar series combination including condenser 75 and resistance 77 is connected between the anode and grid of amplifier tube 26.

Before considering specifically the function of these elements it is desirable to review the operation of the entire system. The handwheel 11, having been set in motion, occasions a displacement between the elements of the synchro 8 and the synchro 5, the result of which is to produce a potential output of the amplifier having a polarity and magnitude substantially proportional respectively to the polarity and magnitude of the displacement between the two self-synchronous devices. In response to this potential the gaseous discharge tubes operate to supply the motor 1 with current to drive the load device and consequently the synchro 5 in a direction to reduce the displacement to zero. As the handwheel 11 slows down, the input signal potential begins to drop due to the fact that the motor is decreasing the displacement between the synchros 5 and 8.

If the inertia of the motor and its load and other conditions be suitable, the motor may retain its maximum speed for a short time so that the back E. M. F. developed in the motor and as impressed upon the grids of the gaseous discharge tubes is higher than the signal potential applied to the gas tubes, whereby one tube will shut off and the opposite tube commence to conduct, thereby sending a braking impulse through the motor. The motor then decelerates even more rapidly until the system comes to rest in the position dictated by the command device 8.

However, the final position of the load device is not exactly the same as the position of the command device. The difference between the two is known as the static error of the system. Similarly, while the command device is in rotation at a constant velocity, the load device likewise rotates at the same velocity. There may, however, be a discrepancy between the instantaneous positions of the two. This angular difference is known as the dynamic error of the system. As previously mentioned, both the static and the dynamic errors can be decreased by increasing the gear ratio between the load device and the load synchro. The greater synchro speed may result in hunting in the system, depending upon the speed of the load device. Merely increasing the maximum speed of the load device without changing the synchro gear ratio may also have the same effect.

I have discovered that this hunting can be completely obviated by properly adjusting the signal amplifier's response time. This I accomplish by introducing in the amplifier's response a time lag, the effect of which varies in accordance with the rate of change of amplifier input voltage. The system thereby anticipates the degree of change of velocity required by the system. This is the function of the resistor 76—condenser 74 combination in circuit with amplifier tube 25 and resistor 77—condenser 75 in circuit with tube 26. These combinations introduce a negative feedback from anode to grid of these tubes. Looked at another way, the feedback circuits reduce the rapidity at which points B and C increase in potential, thereby delaying the increase of positive grid potential applied to the gas tube grids 39 and 40. The amount of delay depends upon the time constant of the R. C. combinations, which can be selected to suit the particular case.

By way of example of a suitable relation between the various elements of the system (but not in any way limiting the scope of my invention) the following are numerical values in a typical case where excellent dynamic and static accuracy were obtained with entirely stable operation:

Maximum speed of load device 4=8.3 R. P. M.
Gear ratio load synchro 5 to load 4=36 to 1
Tubes 25 and 26=twin triode type 6SN7
Applied plate voltage=375 volts
$R_{76}$ and $R_{77}$=75,000 ohms
$C_{74}$ and $C_{75}$=0.5 mf.
$R_{35}$ and $R_{36}$=50,000 ohms
Voltage range across BC=0 to 230 volts.

For greater values of gear ratio or of maximum load speed, the time constant of the R. C. feedback circuits must be decreased. The limiting values of maximum load speed and of gear ratio are thus found to lie only in the mechanical rigidity of the system, i. e. in such factors as the accuracy of the gearing (eccentricity, backlash, etc.), the fit of bearings and the accuracy of the synchro units.

Consequently, the overall accuracy of my system is extremely high; both static and dynamic errors can be kept very low if good mechanical design be provided. This may be ascribed in part to the fact that the gaseous discharge tube motor operating circuit has a flat speed-torque characteristic so that variations in load do not change the value of the synchro-error voltage or displacement voltage, and in part to increased operating speed of the load synchro.

Having now described my invention, I claim:

1. In a positioning system having a load device driven by an electric motor and a command device for operatively controlling the motion of the load device, means producing a potential having a polarity and magnitude proportional respectively to the direction and magnitude of the displacement between said load and said command devices, a vacuum tube amplifying circuit with anode, cathode and grid elements having a time lag circuit connected between anode and grid for limiting the abruptness of the rate of change of said potential and means responsive to said controlled potential for operating said motor.

2. In a positioning system having a load device driven by an electric motor and a command device for operatively controlling the motion of the load device, means producing a potential having a polarity and magnitude proportional respectively to the direction and magnitude of the displacement between said load and command devices, a grid-controlled gaseous discharge tube circuit for operating said motor and adapted to be ultimately controlled by a direct potential of suitable polarity and magnitude, a vacuum tube amplifying circuit with anode, cathode and grid elements having a time lag circuit connected between anode and grid for limiting the abruptness of the rate of change of said first potential and means for impressing said controlled potential upon said gaseous tube circuit.

3. In a positioning system having a load device driven and oriented by an electric motor and a command device adapted to be similarly oriented, means producing a potential having a polarity and magnitude proportional respectively to the direction and magnitude of the angular displacement between said load and said command devices, a vacuum tube amplifier circuit having cathode, grid and anode electrodes for amplifying said potential, means connected between the grid and anode of said amplifying circuit comprising a time lag element for limiting the rate of change of output potential and means responsive to the output potential so limited for operating said motor.

4. In a positioning system having a load device driven and oriented by an electric motor and a command device adapted to be similarly oriented, means producing a potential having a polarity and magnitude proportional respectively to the direction and magnitude of the angular displacement between said load and said command devices, a vacuum tube amplifier circuit for amplifying said potential, negative feedback means in said circuit serving as a time delay element for limiting the rate of change of output potential and means responsive to said output potential for operating said motor.

5. In a positioning system having a load device driven and oriented by an electric motor and a command device adapted to be similarly oriented, means producing a potential having a polarity and magnitude proportional respectively to the direction and magnitude of the angular displacement between said load and said command devices, a vacuum tube amplifier circuit for amplifying said potential, said circuit including a pair of triodes connected in push-pull relation and a series connected resistance and capacitance together connected across anode and grid electrodes of each triode for limiting the rate of change of output potential of said amplifier and means responsive to said output potential for operating said motor.

6. In a positioning system having a load device driven and oriented by an electric motor and a command device adapted to be similarly oriented, means for producing an alternating potential having a phase angle and magnitude corresponding to the direction and magnitude respectively of the instantaneous angular displacement between said load and command device, means for rectifying said alternating potential, a direct current vacuum tube amplifier circuit for amplifying said rectified potential, negative feedback means in said amplifier connected between the output and the input thereof for limiting the abruptness of the rate of change of the output potentials, a grid-controlled gaseous discharge tube circuit for operating said motor and means for impressing said amplifier's output potentials upon said discharge tube circuit.

7. In a positioning system having a load device operated and oriented by an electric motor and a command device adapted to be similarly oriented, comprising a load servo driven by the load and a command servo driven by the command device, said servos being connected together to produce an output alternating potential having a phase angle and a magnitude corresponding respectively to the direction and magnitude of angular displacement of one servo relative to the other, a pair of grid-controlled gaseous discharge devices and circuits therefor for supplying current to the motor, one of said discharge devices being operative for each direction of rotation of said motor and said discharge devices being adapted to be ultimately controlled by the magnitude and polarity of a direct potential applied to the control grids, means for rectifying said servo output alternating potential, to produce a direct potential having a polarity and magnitude corresponding respectively to the phase angle and magnitude of said alternating potential, means for amplifying said potential including means for limiting the abruptness of the rate of change of the amplified potential and means for impressing the controlled amplified potential on said control grids.

WILLIAM G. GORTON.

REFERENCES CITED

The following references are of record in the file of this patent:

UNITED STATES PATENTS

| Number | Name | Date |
|---|---|---|
| 2,088,654 | Hull | Aug. 3, 1937 |
| 2,270,295 | Harley | Jan. 20, 1942 |
| 2,315,043 | Boucke | Mar. 30, 1943 |